United States Patent [19]

Ryan

[11] Patent Number: 5,330,383
[45] Date of Patent: Jul. 19, 1994

[54] FISH TRANSFER MECHANISM

[76] Inventor: Robert M. Ryan, 5651 - 40th Ave. West, Seattle, Wash. 98199

[21] Appl. No.: 92,718

[22] Filed: Jul. 16, 1993

[51] Int. Cl.$^5$ .................. A22C 25/08; A22C 25/12
[52] U.S. Cl. ............................. 452/182; 452/179
[58] Field of Search ............... 452/182, 179, 180; 198/359, 523; 209/910

[56] References Cited

U.S. PATENT DOCUMENTS

| | | | |
|---|---|---|---|
| 4,084,294 | 4/1978 | Dohrendorf | 452/182 |
| 4,344,207 | 8/1982 | Rosenberg | 452/179 |
| 4,613,031 | 9/1986 | Wenzel | 452/179 |
| 5,259,810 | 11/1993 | Evers et al. | 452/182 |

FOREIGN PATENT DOCUMENTS 1271932 7/1968 Fed. Rep. of Germany ...... 452/179

*Primary Examiner*—Willis Little
*Attorney, Agent, or Firm*—Seed & Berry

[57] ABSTRACT

The fish transfer mechanism in which a fish slides down a smooth inclined plate and engages an upright protruding rotation pin. The head end of a fish rides up on a head guide. The rotation pin and the effect of gravity tends to rotate the fish from its transverse orientation to a longitudinal orientation while the fish head guide twists the fish toward an upright, vertical, belly down condition with the fish facing forward and ready to be cleaned by the fish gutter.

9 Claims, 4 Drawing Sheets

FISH TRANSFER MECHANISM

DESCRIPTION

1. Technical Field

This invention pertains to a fish handling apparatus.

2. Background of the Invention

This invention relates to apparatus for changing the orientation of fish from a transverse orientation across a conveying path and on its side to an upright forward facing position longitudinal of the path.

3. Description of the Prior Art

In transferring fish between a fish header and a fisher gutter, the fish are usually removed manually from the fish header and reoriented into a position suitable for automatically gutting and cleaning the fish in a fish gutter.

SUMMARY OF THE INVENTION

It is an object of this invention to provide an automated fish transferring mechanism which changes the orientation of fish leaving a fish heading machine to the orientation necessary for a fish gutting machine.

It is a more specific object of this invention to automatically change the orientation of a fish lying transverse to a conveying path and on its side to an orientation in which it is lying upright and facing forward in the direction of movement. In one embodiment the fish also is moved to a belly-down position.

Basically, these objects are obtained by moving a fish in a position on its side and transverse to the conveying path against a pin which rotates the fish into a forward facing direction while lifting the forward end of the fish on a ramp to twist the fish into an upright position with the forward end facing forward. In the preferred embodiment, the fish is moved against the pin by sliding down a smooth plate using gravity and the fish is twisted into a belly-down position.

DETAILED DESCRIPTION OF THE INVENTION

Figure 1:
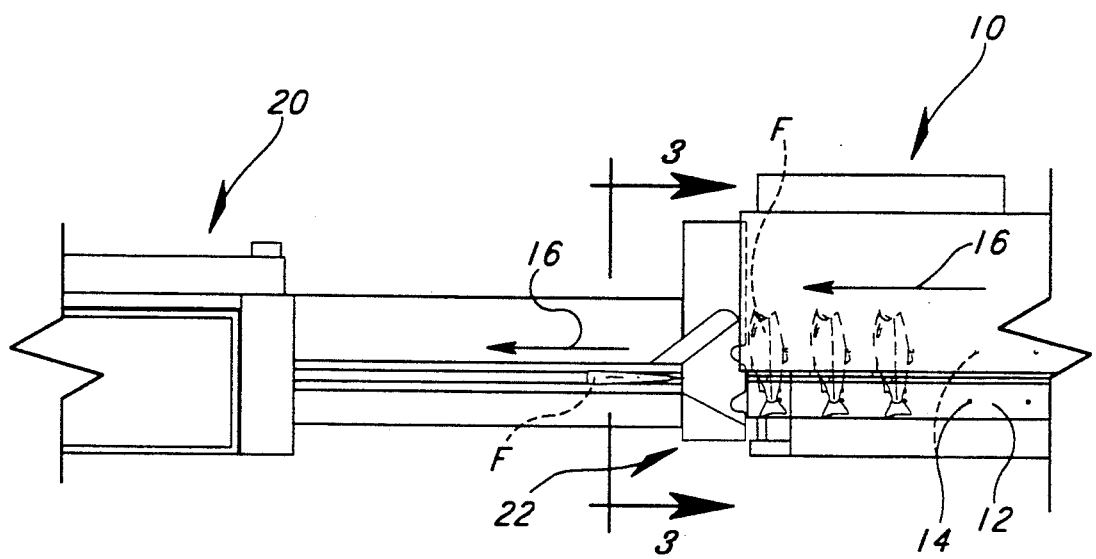
FIG. 1 is a schematic fragmentary plan view of a fish header, the transferring mechanism of this invention, and a fish gutter.
Figure 2:
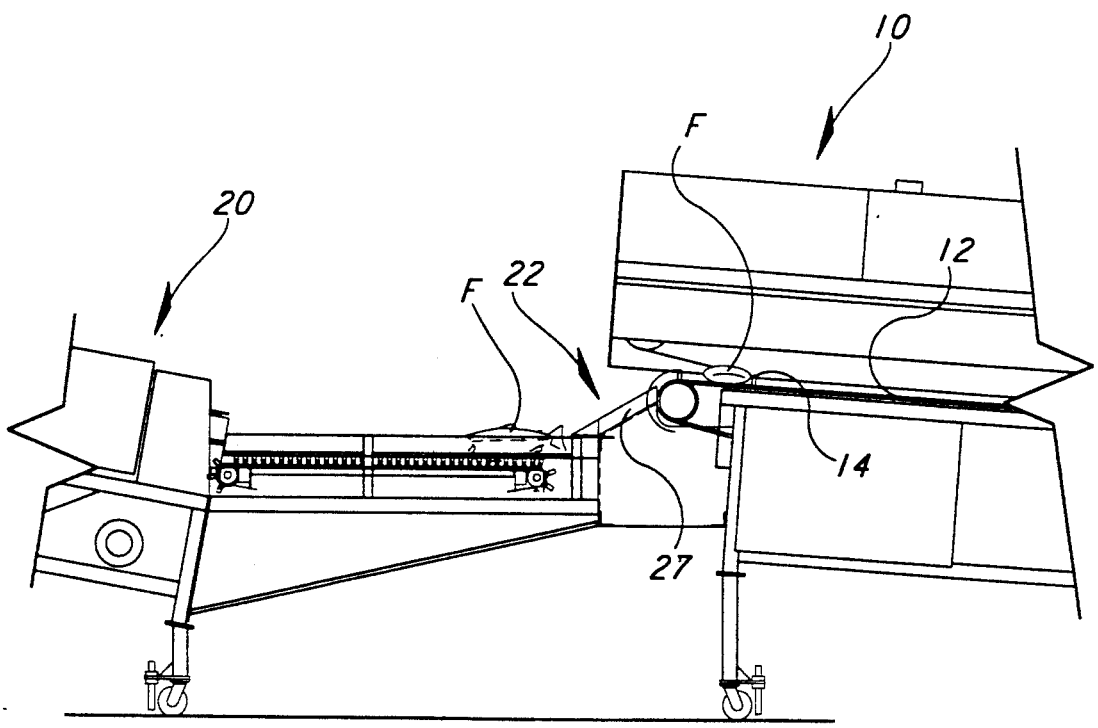
FIG. 2 is a side elevation of the apparatus shown in FIG. 1.

As best shown in FIG. 1, a fish header 10 has a typical chain link conveyor 12 having upright fish conveying or push pins 14 protruding upwardly from its upper surface. The fish F with their heads and tails intact are laid on their sides and in a transverse orientation relative to the direction of movement of the conveying path 16. As the fish move to the left in FIG. 1, the heads are removed in a well known manner and the fish reach the left hand side of the header, as viewed in FIG. 1, still lying on their sides and facing transversely of the conveying path 16.

Also shown in FIG. 1 is a fish gutter 20 of a known construction in which fish need to be delivered to the entrance at the right, as viewed in FIG. 1, in an upright position generally with the belly down and with the fish facing forwardly in the direction of movement of the conveying path. At the fish gutter, the fish cavity is entered by various cleaning implements as the fish is moved along the conveying path to remove the viscera, eggs and other organs of the fish. The fish leaving the fish gutter is clean and ready for further processing.

Figure 3:
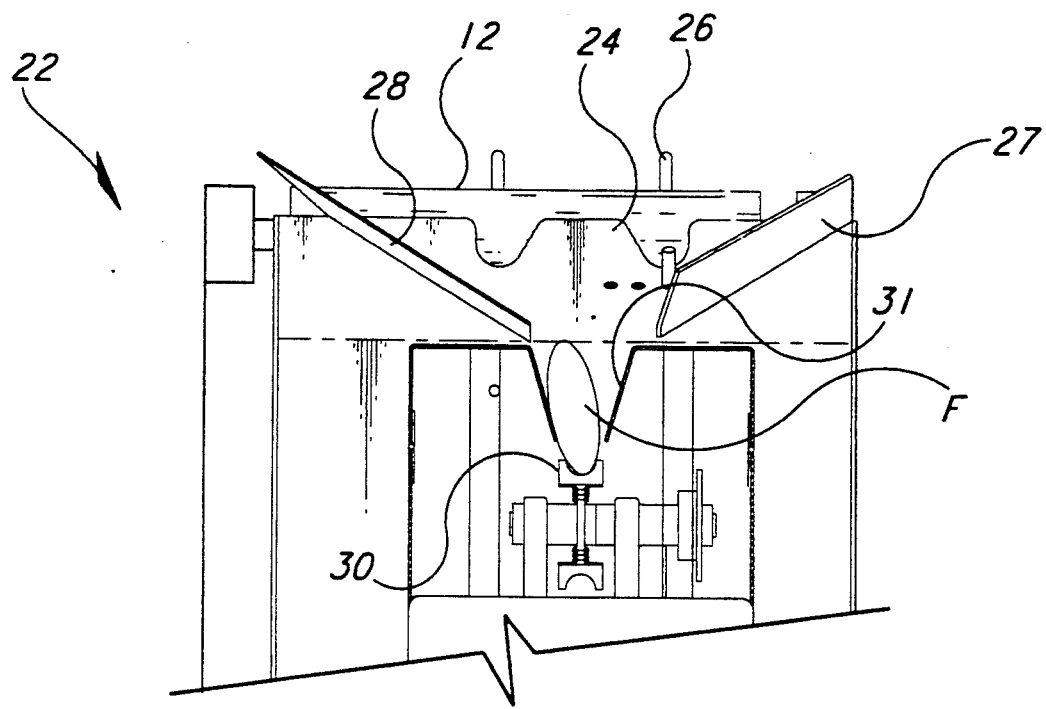
FIG. 3 is a section taken generally along the line 3—3 showing essentially a front elevation of the fish transfer mechanism as viewed from the fish gutter.
Figure 4:
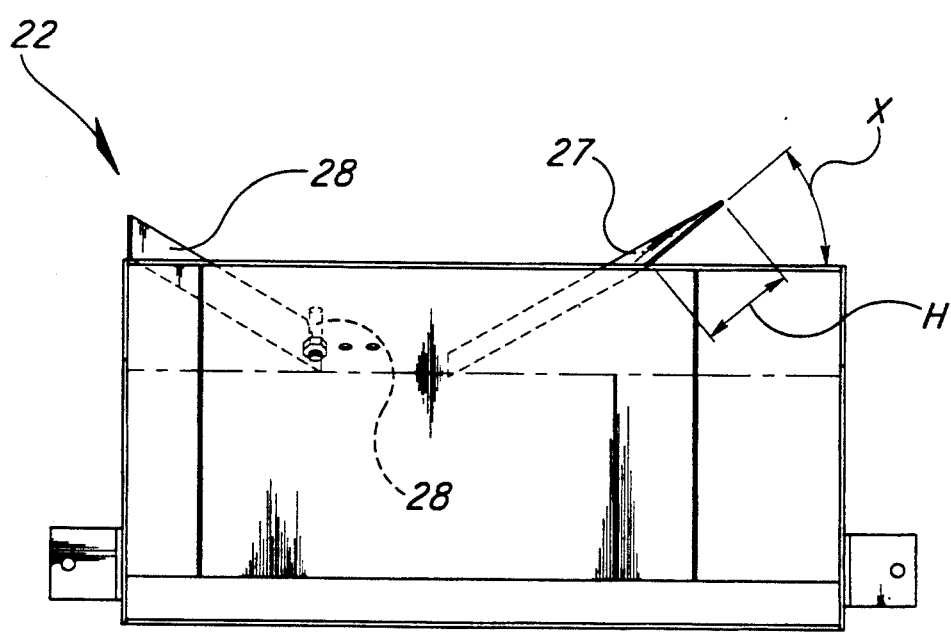
FIG. 4 is a fragmentary rear elevation of the transferring mechanism.
Figure 5:
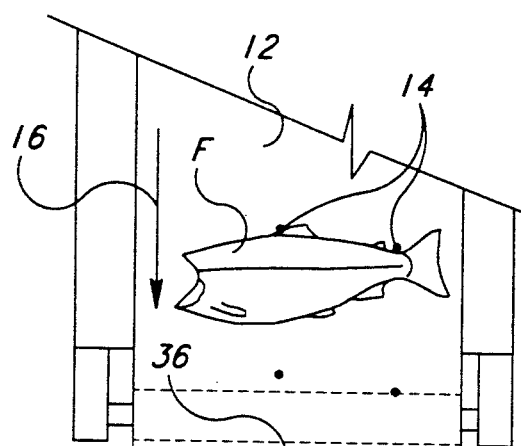
FIGS. 5—9 are schematic operational plan views illustrating the movement of the fish through the fish transfer mechanism.
Figure 6:
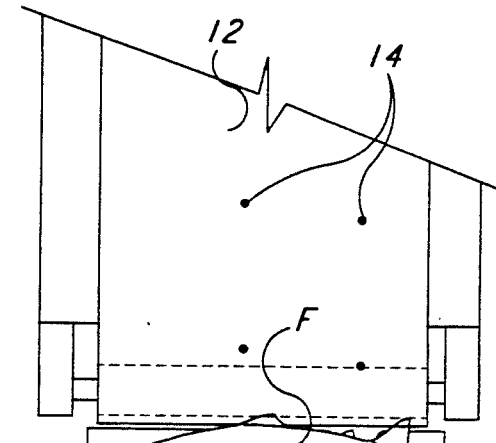
Figure 7:
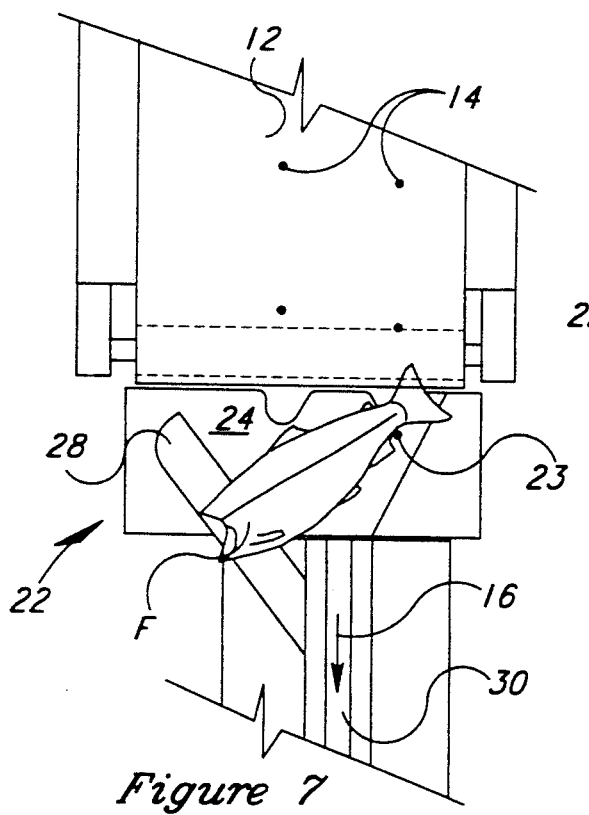

It is a unique feature of this invention that between the fish header and the fish gutter is positioned a fish transferring mechanism 22. The fish transferring mechanism is best shown in FIGS. 3 and 5 and includes a downwardly sloping smooth surface plate 24, an upwardly protruding pin 23 protruding at right angles from the surface of the plate 26, a tail guide 27 and a head guide 28. The pin is attached by any suitable means such as by a nut connected to a threaded end of the pin. The guides may be welded or attached by suitable fasteners. The tail guide is a plate protruding upright at a right angle to the smooth plate 24. The head guide is at an angle of about forty degrees from the plate 24. Both guides converge downwardly toward one another as shown in FIG. 3. The head guide is about four inches in height "H" along its surface sufficient to lift the forward end of the fish and start it twisting into a vertical position. At the discharge end of the transfer mechanism is a conventional fish conveyor 30 having downwardly converging side walls 31 and is of the type which carries the fish in a vertical upright condition. Preferably the fish is positioned belly-down, however, the mechanism also works if the fish is carried on conveyor 12 with the belly pointing rearward and thus can be twisted into a belly-up position by the transfer mechanism. The fish on this conveyor 30 then can be delivered into the gutter.

The pin 23 can be fitted into any of the holes 21 for adjustments, if needed. Also the tail guide may not be necessary for transferring some fish.

The operation of the fish transfer mechanism is best seen in FIGS. 5-9. A fish lying on the conveyor 12 and being moved by the upright push pins 14 has had its head removed. The fish has its belly portion forward and the fish is lying transversely on the conveying path 16. The fish is then delivered to the fish transfer mechanism where it slides down the plate 24. Recesses 36 in the plate allow clearance for the fish push pins 14 so that the fish is propelled onto the plate in its transverse position and on its side.

Figure 8:
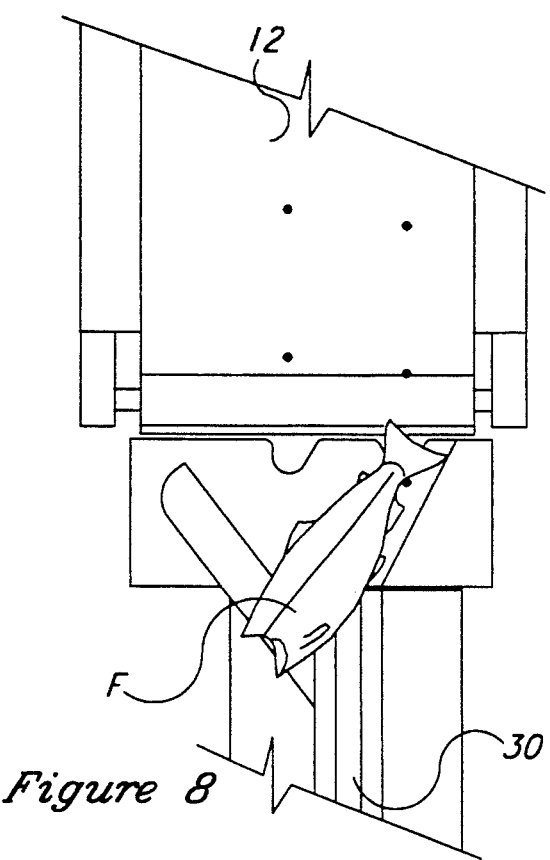
Figure 9:
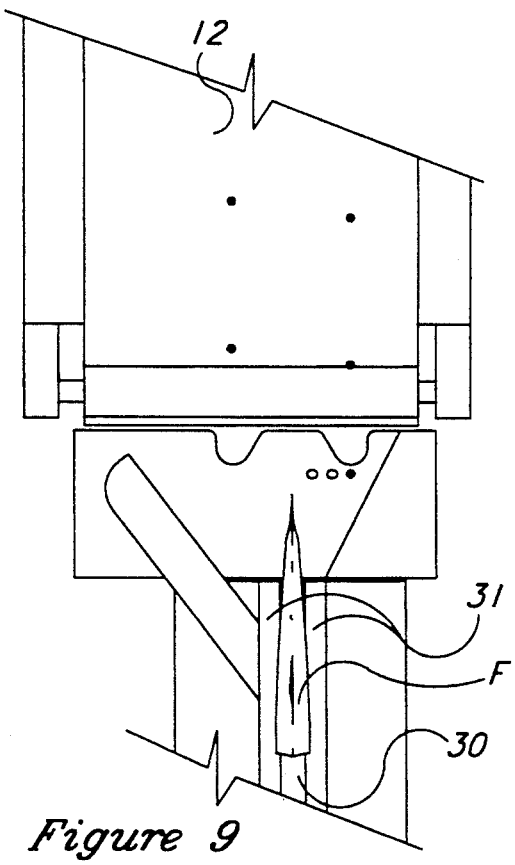

The fish then begins to slide down the smooth plate 24 and is engaged by the rotation pin 26. The rotation pin engages a fish in from the tail. The head of the fish rides up on the head guide 28. As the fish slides further down the plate 24 the forward end of the fish begins to rotate into a longitudinal position as shown in FIG. 8. As the fish rotates about the pin 26, it is also lifted and twisted into an upright position with the belly down and the fish facing forward in a longitudinal direction with the conveying path 16.

While the preferred embodiments of the invention have been illustrated and described, it should be apparent that variations will be apparent to those skilled in the art without departing from the principles herein and disclosed in the drawing.

I claim:

1. A fish transfer mechanism for operating between a fish header and a fish gutter to change the orientation between the header and the gutter of a fish having a forward end and a central body having a belly, comprising an infeed conveyor, for holding the fish on its side in a transversely aligned position;

an outfeed conveyor, for holding the fish upright on its belly in a longitudinally aligned position;

a downwardly and forwardly sloped transfer surface adjacent to the infeed conveyor at one end and the outfeed conveyor at the opposite end;

rotating means at said transfer surface for engaging a fish leaving said infeed conveyor and causing the fish to rotate from a transversely aligned position on the infeed conveyor to a longitudinally aligned position aligned with the outfeed conveyor; and turning means at said transfer surface for twisting the fish from its side to its belly down position.

2. The transfer mechanism of claim 1, further including a tail guiding member for holding the fish to locate the fish on the rotating means.

3. The mechanism of claim 1, said transfer surface including a smooth plate, said rotating means including a pin protruding from said smooth plate for engaging the fish while sliding down the plate on its side, said turning means including a head guide plate protruding upwardly from the smooth plate and extending downwardly and inwardly above said smooth plate for engaging the forward end of the fish to twist it into a belly down position.

4. The mechanism of claim 2, said transfer surface including a smooth plate, said rotating means including a pin protruding upright from said smooth plate for engaging the central body of the fish while sliding down the plate on its side, said turning means including a head guide plate protruding upwardly from the smooth plate and extending downwardly and inwardly above said smooth plate for engaging the forward end of the fish to twist it into a belly down position, said tail guiding member also including a second guide plate protruding upwardly from said smooth plate, being on the opposite side of the pin from the first guide plate and also extending downwardly and converging with said first guide plate.

5. A fish transfer mechanism for turning a fish having a forward end and a central portion having a belly from a transversely facing position on its side on an infeed conveyor to a longitudinal forwardly facing position in an outfeed conveyor relative to a conveying path, comprising an outfeed conveyor having downwardly converging sloped opposite sidewalls, a transfer surface, a head guiding plate protruding up from said transfer plate and sloped inwardly relative to said converging path, and a rotate pin protruding up from said transfer surface and located to one side of said head guiding plate, said rotate pin rotating the fish to a forwardly facing position and said head guide deflecting the fish into the sloped side walls of the outfeed conveyor to twist the fish into a vertically upright forwardly facing position.

6. The mechanism of claim 5, including a tail guiding plate, said rotate pin located nearer said tail guiding plate than said head guiding plate and near the upstream end of said guiding plates.

7. The mechanism of claim 5, said fish being deflected into a belly down position.

8. A fish transfer mechanism to change the orientation of a fish having a forward end and a central portion having a belly traveling in a conveying path from a position on its side and facing transversely of the conveying path to a position facing forwardly and longitudinally of the conveying path, comprising a downwardly and forwardly sloping transfer surface;

rotating means at said transfer surface for engaging a fish and causing the fish to rotate by gravity from said transverse position to said longitudinal position; and turning means adjacent said transfer surface for engaging the fish and causing the fish to twist from its side to its forwardly facing position vertically upright position.

9. The mechanism of claim 8, said fish being twisted enter a belly down position.

* * * * *

UNITED STATES PATENT AND TRADEMARK OFFICE
CERTIFICATE OF CORRECTION

PATENT NO. :
DATED       :   5,330,383
INVENTOR(S) :   July 19, 1994
                Robert M. Ryan It is certified that error appears in the above-identified patent and that said Letters Patent is hereby corrected as shown below:

In column 4, claim 9, line 42, please delete "enter" and substitute therefor --into--.

Signed and Sealed this

Twenty-second Day of November, 1994

Attest:

BRUCE LEHMAN

*Attesting Officer*          *Commissioner of Patents and Trademarks*